June 5, 1956  N. OLNEY  2,748,531

EYE ASSEMBLY FOR USE IN A DOLL'S HEAD

Filed Nov. 26, 1951

INVENTOR.
NATHANIEL OLNEY
BY James and Franklin
ATTORNEYS 2,748,531
Patented June 5, 1956

United States Patent Office

2,748,531

EYE ASSEMBLY FOR USE IN A DOLL'S HEAD

Nathaniel Olney, New York, N. Y., assignor to Margon Corporation, Bayonne, N. J., a corporation of New Jersey Application November 26, 1951, Serial No. 258,112

2 Claims. (Cl. 46—169)

The invention relates to flexible dolls' heads, and more particularly to movable or sleeping eyes therefor.

As described in application Serial No. 224,351, filed May 3, 1951, since issued on December 7, 1954 as Patent No. 2,696,064, having the same assignee as the present application, it is desired to mount eye assemblies of the movable or sleeping type within flexible dolls' heads having molded therein sockets which are closed except for the eye openings. The eye assemblies must be inserted from the front through the eye openings.

The eye is assembled within an outer housing, which with the doll is suitably rotatable about the eye, and protects the eye against shock and the compressive forces of the elastic material forming the socket.

The eye housing is of two separate members constructed to simplify their assembly with each other and with the eye which they pivotally support and enclose.

One object of the present invention is to generally improve such eye assemblies.

A more specific object of the invention is to so form the eye housing members that they may be identical in construction, thereby affording a less expensive method of manufacture than would obtain if they were made of dissimiliar construction.

These and other objects of the invention will be apparent from the following detailed description taken with the accompanying drawing, wherein.

Figure 1:
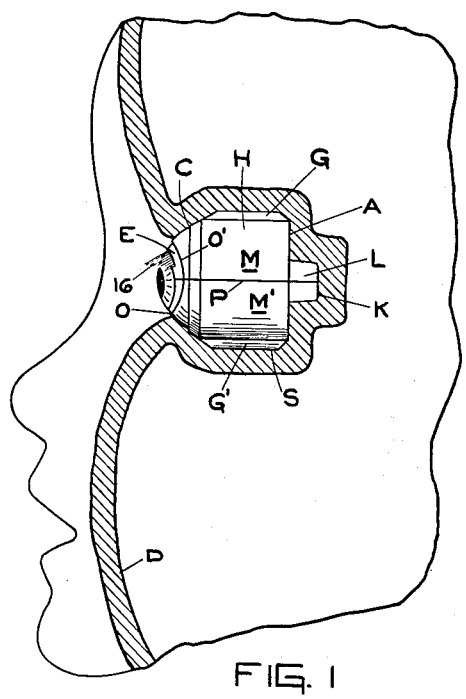
Fig. 1 is a vertical section taken through one of the eye sockets of a flexible doll's head, said eye socket having disposed therein an eye assembly made in accordance with the present invention.

Referring to the drawings, particularly to Fig. 1, a doll's head D is molded of a suitable flexible plastic material and, at the same time, eye sockets S (only the nearer one of which is visible) are molded within the head. The doll's head is molded with eye openings O through which eye assemblies A are inserted.

In both forms of the invention shown, the eye assembly A comprises an eye E and a housing H. The eye has a weight W secured therein or formed as a part thereof and is provided with means for pivotally mounting the eye and weight within the housing to furnish the desired sleeping effect. The housing and eye are provided with mating bearings and trunnions on opposite sides of the eye to pivotally mount the eye.

The housing H is formed of two members M and M', which in the preferred form of the invention, are of the same or identical construction. The housing members M and M' are formed to be assembled together, enclose the eye and weight, and pivotally mount them for sleeping action. The split or parting line P between the housing members extends fore and aft or longitudinally of the assembly. The edges of the housing members along at least a portion of the parting line P are formed to matingly engage each other in a snug fit. When assembled the housing members provide an opening O' of substantially elliptical contour at the front of the assembly to expose a part of the eye E.

Figure 3:
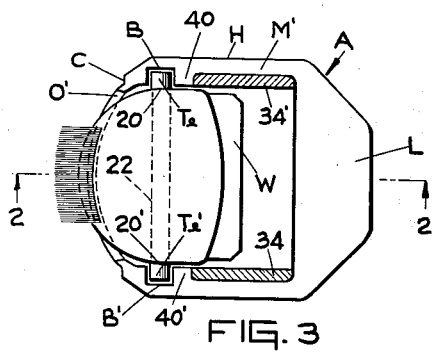
Fig. 3 is a top view, partly in section, taken approximately in the plane of line 3—3 of Fig. 2.
Figure 5:
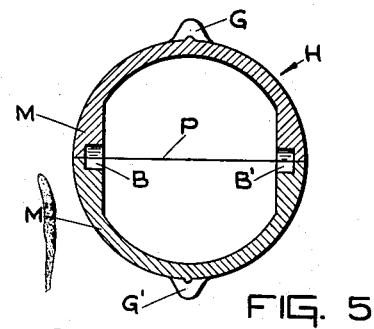
Fig. 5 is a vertical section taken approximately in the plane of line 5—5 of Fig. 2, showing the manner in which the eye housing members provide bearings for pivotally mounting the eye, the eye also being omitted in this view for the purpose of clarity in illustration.
Figure 6:
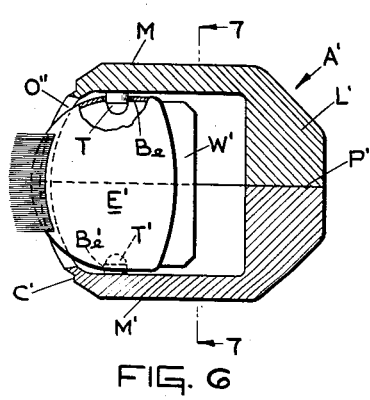
Fig. 6 is a view, similar to Fig. 3, showing a modified form of the invention.
Figure 7:
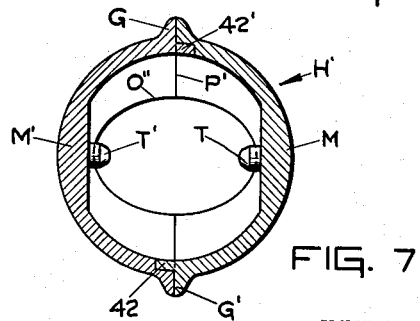
Fig. 7 is a vertical section taken approximately in the plane of line 7—7 of Fig. 6, with the eye omitted for the purpose of clarity in illustration, showing the manner in which the eye housing members of the modified form of the invention are assembled.

To pivotally mount the eye within the housing, the assembled housing members M and M' may be made to provide either a pair of spaced, diametrically opposite bearings B, B', as in Fig. 5, or trunnions T, T', as in Fig. 7, the eye correspondingly being provided with a pair of mating trunnions $T_e$ and $T_e'$, as in Fig. 3, or bearings $B_e$, $B_e'$, as in Fig. 6, respectively. Whether the bearings are formed in the housing and the trunnions provided by the eye, or vice versa, each housing member of a given pair may be identical with the other.

In the preferred form of the invention, the housing H is formed with a circular ledge or step C extending around the front of the housing to provide an abutting surface against which a suitable pusher element may be pressed to facilitate the insertion of an eye assembly into an eye socket. Each housing member provides one half of the ledge C in the assembled housing.

The outer periphery of the housing H is provided with guiding means G and G' at diametrically opposite sides of the assembly to align and guide the eye assembly as it is being inserted into the socket, thereby properly positioning and orienting the eye assembly in the socket or head. One guiding means may be molded or formed on each housing member, as in Fig. 4, or like complementary parts of a guiding means may be formed on each housing member, as in Fig. 7, to maintain the sameness in construction of the housing members. Suitable means for accomplishing the insertion and guiding are disclosed in the aforesaid co-pending patent application.

To assure that the eye assembly is correctly located and oriented within the eye socket, and to lock the eye assembly in such position, the housing H is provided with locking or keying means L at the rear thereof. Each housing member may be formed to provide one half of the locking or keying means L, either collaterally, as in Figs. 2 and 3, or end-to-end, as in Fig. 6, thereby maintaining the same construction of the housing members. The inner end of the eye socket S is formed or molded with a slot or keyway K predeterminedly dimensioned and located in the socket to receive the locking means L.

Referring to Figs. 1 through 5 for one specific embodiment of the invention, to eye E comprises a substantially hollow metal shell 10 within which is secured a lens 12 (see Figs. 1 and 2), which simulates the iris and pupil. The eye shown is generally described in the patent to Marcus, 2,254,232, granted September 2, 1941. The shell 10 may be slotted at 14 to receive an eyelash 16 which protrudes through the slot, and the base of which is cemented to the inside of the shell. The shell is flesh colored above the eyelash to simulate an eyelid. The weight W, which may be made of lead or other material of suitable mass, is secured within the lower inside part of the shell by striking small sections 18 of the shell into the weight. The shell 10 is provided with diametrically opposite apertures 20 and 20' through which a pivot pin 22 is passed. The ends of the pin protrude outside of the shell and provide the oppositely extending trunnions $T_e$ and $T_e'$.

The eye may be made in other suitable ways. Instead of providing a plastic lens for the metal shell 10, the entire eye may be made of metal, and the simulation of the pupil, iris and eyelid may be printed directly on the metal. If desired, the shell may be made of plastic instead of metal. Also, the lens and the shell may be integrally molded in one piece of plastic material. Instead of using a separate shaft to provide the trunnions $T_e$ and $T_e'$, the trunnions may be molded as integral parts of a molded plastic or die-cast metal shell. Also, instead of separately forming the weight and securing same within the shell, the weight may be molded or cast as an integral part of the shell.

As shown in Figs. 1, 2, 4 and 5, the eye housing H is split or formed of two housing members M and M' which are identical in construction. Preferably, the housing members are formed by molding a suitable plastic composition, or by die-casting a suitable metal alloy. The division of the housing into the two separate parts facilitates enclosing the eye within the housing and journaling the trunnions $T_e$, $T_e'$ within the bearings B, B' to supply the desired sleeping action. The division or parting line P between the two housing members extends fore and aft or longitudinally of the assembly, and in a horizontal plane with respect to the position the eye assembly assumes when inserted in the socket S, as shown in Fig. 1.

The inside dimension of the housing H is slightly larger than the outside dimension of the eye and provides clearance for relative rotation. The inside of each housing member is molded to provide a substantially cylindrical segment 24 in the rear portion thereof, and a portion of a hemisphere 26 at the front thereof conforming in contour substantially to the contour of the eye. An intermediate conical portion 28 connects the portions 24 and 26.

As shown in Fig. 5, each housing member is formed at diametrically opposite sides with spaced, open bearing portions which supply half of each of the split bearings B and B'. The open bearing portions are located approximately at the intersection of the cylindrical and conical sections 24 and 28, and at the parting line P so that when the members M and M' are assembled, a pair of axially aligned closed bearings B and B' are provided to receive the trunnions $T_e$, $T_e'$.

Figure 4:
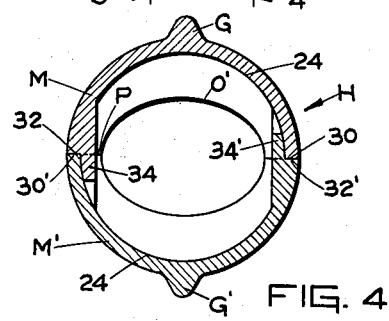
Fig. 4 is a vertical view, partly in section, taken approximately in the plane of line 4—4 of Fig. 2 showing the manner in which the eye housing members are assembled, the eye being omitted in this view for the purpose of clarity in illustration.

As best shown in Fig. 4, each of the housing members is provided at the rear segment 24 with a straight edge portion 30 on one side and a stepped portion 32 on the other side. (The same elements on the member M' are designated with the same numerals primed.) A lap extension 34 is provided adjoining the stepped portion 32 so that when the housing members are assembled, the edge portions 30, 30' abut the step portions 32', 32, respectively, and the extensions 34, 34' overlap the edges 30', 30, respectively, in a smooth, neat joint. Relative movement in longitudinal direction is prevented because the parts 34 and 34' (Fig. 3) do not extend full length, and instead fit behind parts 40 and 40' near the bearings.

Figure 2:
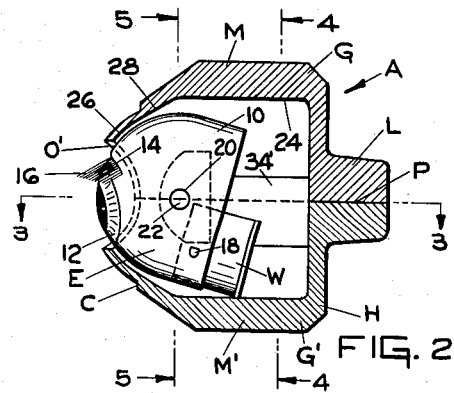
Fig. 2 is a vertical view, partly in section, of an eye assembly made in accordance with the present invention taken approximately in the plane of line 2—2 of Fig. 3.

As shown in Fig. 2, the inside surface of either housing member may provide a stop for the eye when assembled within the housing members, the parts being dimensioned so that the bottom edge of the weight contacts the inner surface of a housing member within the segment 24.

The extreme front portion 26 of each housing member is made to provide half of the opening O' on each side of the parting line P. These eye opening portions may be formed at the time that the housing members are molded, or, if desired, the opening portions provided by each housing member may be made by punching out the desired section of the material in the otherwise closed face of the molded members.

To assemble the eye E and its weight W within the housing H, the trunnions $T_e$ and $T_e'$ are placed within the bearing portions of either of the housing members M or M'. The second housing member is then press-fitted to the first housing member whereupon the bearing portions are closed off to capture and journal the trunnions $T_e$ and $T_e'$ within the bearings B and B'. The parts are suitably dimensioned so that the extensions 34, 34' on each housing member provide a friction fit within the adjoining sides of the other housing member. The eye assembly A is now ready to be inserted into the socket S through the eye opening O.

Another form of the invention is shown in Figs. 6 and 7. In this form of the invention the main difference is that the parting plane is vertical instead of horizontal. Another difference is that the trunnions T and T' are provided by the housing members M and M' of the housing H', and the eye E' provides the mating bearings $B_e$ and $B_e'$ to receive the trunnions. The bearings $B_e$ and $B_e'$ may be formed by simple apertures in the eyeshell.

In this showing of the invention, the housing members are also identical in construction. Each housing member provides one of the trunnions. The parting line P' also extends fore and aft or longitudinally of the assembly, but in a vertical rather than a horizontal plane with respect to the position the eye assembly assumes when inserted within the socket of the doll's head. Thus, the joint between housing members is located at the top and bottom of the assembly A' instead of at the lateral sides. The edges of each of the housing members may be formed along at least a portion of the parting line P' in the manner previously described to permit the members to be snap or press-fitted together. Here again the parts 42 and 42' (Fig. 7) preferably extend less than full length, and bear against other parts at their ends, to prevent relative longitudinal movement of the two housing members.

Each housing member again provides one half of the ledge C' in the assembled housing. The guiding means G and G' are located at the parting line P', and are provided by a complementary portion on each housing member. The split line through the locking means L' is in a vertical plane instead of a horizontal plane, so that the two halves of the locking means are disposed end-to-end instead of face-to-face. Half of the opening O" also is provided by each housing member. However, instead of the parting line passing through the long axis of the eliptical opening, it passes through the short axis.

To assemble the eye E' and its weight W' within the housing H', one of the bearings such as $B_e'$ may be placed over the trunnion T' of the housing member M'. The trunnion T of the housing member M is then inserted in the bearing $B_e$ and the housing members press-fitted together, whereupon the axially aligned trunnions T, T' will be journaled within the bearings $B_e$, $B_e'$ and the eye and its weight will be simply and properly mounted. The eye assembly is now ready to be inserted into the eye socket S through the opening O.

It will be perceived that the eyes may be provided with trunnions as in Fig. 3, and the housing with bearings, instead of vice versa. In such case the bearings may be like those shown in Figs. 3 and 5 except that they are not split.

It is believed that the construction of the eye assembly of my invention, and the relationship of its parts, as well as the advantages thereof, will be apparent from the foregoing detailed description. The housing members are made to be simply and properly assembled with each other and to mount the eye and its weight in proper position for the desired sleeping action of the eye. By making the housing members of identical construction, the cost of molds and dies is materially reduced. Also, the universality of the housing members simplifies the handling of the elements in the assembly of the parts, thereby further reducing the cost of manufacture.

It will be apparent that while I have shown and described my invention in several preferred forms, changes may be made in the structures disclosed without departing from the scope of the invention, as sought to be defined in the following claims.

I claim:

1. A doll's eye assembly comprising an eye provided with a weight and a housing formed of two members of a plastic material and of identical construction, said members being assembled to enclose said eye and weight and having an opening to expose a part of the eye, the parting line between said housing members extending longitudinally of the assembly, said eye and housing having mating bearings and trunnions on opposite sides of the eye, the division of said housing into separate housing members being on a plane so oriented in relation to the trunnions and bearings that when the housing members are brought together with the eye therebetween and exposed through the opening the trunnions are received in the bearings, each of said housing members having its edges so stepped and dimensioned along at least a portion of said parting line that said housing members matingly engage each other with an overlapping frictional press-fit when assembled.

2. A doll's eye assembly comprising an eye provided with a weight, said eye and weight having a pair of oppositely extending trunnions for pivotally mounting same, a housing formed of two members of a plastic material and of identical construction, said members being assembled to enclose said eye and weight and having an opening to expose a part of the eye, the parting line between said housing members extending longitudinally of the assembly, each of said two housing members having a pair of spaced open bearings on diametrically opposite sides at said parting line, said housing members when assembled providing a pair of axially aligned closed bearings receiving the aforesaid trunnions, each of said housing members having its edges so formed and dimensioned along at least a portion of said parting line that said housing members matingly engage each other with an overlapping frictional press-fit when assembled.

References Cited in the file of this patent

UNITED STATES PATENTS

| | | |
|---|---|---|
| 2,039,928 | Popovich | May 5, 1936 |
| 2,520,491 | Bunin | Aug. 29, 1950 |
| 2,526,458 | Bronnenkant | Oct. 17, 1950 |
| 2,531,066 | Lynch | Nov. 21, 1950 |
| 2,533,590 | Kutik | Dec. 12, 1950 |
| 2,566,111 | Baggott | Aug. 28, 1951 |
| 2,590,515 | Derham | Mar. 25, 1952 |
| 2,603,762 | Goodchild | July 15, 1952 |
| 2,696,064 | Wolfe et al. | Dec. 7, 1954 |

FOREIGN PATENTS

| | | |
|---|---|---|
| 543,756 | Great Britain | Mar. 11, 1942 |
| 575,139 | Great Britain | Feb. 5, 1946 |